United States Patent [19]

Hartman et al.

[11] Patent Number: 5,575,086
[45] Date of Patent: Nov. 19, 1996

[54] FLUIDIZED BED WITH IMPROVED NOZZLE CONSTRUCTION

[75] Inventors: Ernest L. Hartman, Bloomfield; Michael C. Tanca, Tariffville, both of Conn.

[73] Assignee: Combustion Engineering, Inc., Windsor, Conn.

[21] Appl. No.: 307,139

[22] Filed: Sep. 16, 1994

[51] Int. Cl.[6] ............................................. F26B 17/00
[52] U.S. Cl. ...................................... 34/585; 122/4 D
[58] Field of Search ............................. 34/582, 583, 584, 34/585; 122/4 D; 110/245; 432/58; 165/104.16

[56] References Cited

U.S. PATENT DOCUMENTS

| | | | |
|---|---|---|---|
| 2,841,476 | 7/1958 | Dalton | 34/585 |
| 3,672,577 | 6/1972 | Kramer | 34/585 |
| 3,708,887 | 1/1973 | Erisman | 34/585 |
| 3,834,624 | 9/1974 | Novosad et al. | 34/585 |
| 4,628,831 | 12/1986 | Delessard | 34/585 |
| 5,372,791 | 12/1994 | Abdulally | 34/585 |

Primary Examiner—John T. Kwon
Attorney, Agent, or Firm—Robert S. Smith

[57] ABSTRACT

A fluidized bed system which includes a housing and a floor comprising a plurality of generally parallel tubes joined by fins intermediate adjacent tubes. A plurality of nozzle assemblies extend generally vertically in mutually parallel relationship from the floor. Each of the nozzle assemblies includes a generally cylindrical body having a centerline disposed in generally perpendicular relationship to the floor and each of the bodies includes a plurality of heads extending generally radially therefrom at an axial extremity thereof remote from the floor. In some embodiments of the invention each of the heads are uniformly spaced around the circumferential extent of each of the bodies and each of the heads is generally cylindrical and has a centerline. Each of the centerlines of the heads may be disposed at an angle with respect to a horizontal plane and the angle may be approximately twenty degrees. In some forms of the invention some of the nozzle assemblies each have four heads and some of the nozzle assemblies have two heads. In other embodiments all of the nozzle assemblies have two heads. In other embodiments all of the nozzle assemblies have four heads.

7 Claims, 3 Drawing Sheets

FLUIDIZED BED WITH IMPROVED NOZZLE CONSTRUCTION

BACKGROUND OF THE INVENTION

The invention relates to fluidized bed apparatus and has particular application to fluidized bed combustion apparatus in steam generation apparatus. While the present invention has primary application to a combustion process in a steam generating system, it will be understood that the present invention may also be used in a wide variety of fluidized bed apparatus. Those skilled in the art will further recognize that fluidized beds have been used for decades in non-combustion reactions in which the thorough mixing and intimate contact of the reactants in a fluidized bed result in high product yield with improved economy of time and energy.

Fluidized bed combustion apparatus can burn coal efficiently at temperatures low enough to avoid many of the problems of combustion in other modes. The term "fluidized bed" refers to the condition in which solid materials are given free flowing, fluid-like behavior. As a gas is passed upward through a bed of solid particles, the flow of gas produces forces which tend to separate the particles from one another. At low gas flows, the particles remain in contact with other solids and tend to resist movement. This condition is referred to as a fixed bed. As the gas flow is increased, a point is reached at which the forces on the particles are just sufficient to cause separation. The bed is then deemed to be fluidized. The gas cushion between the solids allows the particles to move freely, giving the bed a liquid-like characteristic.

Fluidized bed combustion makes possible the burning of fuels having such a high concentration of ash, sulfur, and nitrogen that they would ordinarily be deemed unsuitable. By the use of this process it is possible, at least in some cases, to avoid the need for gas scrubbers while still meeting emissions requirements. In fluidized bed combustion, the fuel is burned in a bed of hot incombustible particles suspended by an upward flow of fluidizing gas. Typically the fuel is a solid such as coal, although liquid and gaseous fuels can be readily used. The fluidizing gas is generally combustion air and the gaseous products of combustion. Where sulphur capture is not required, the fuel ash may be supplemented by inert materials such as sand or alumina to maintain the bed. In applications where sulphur capture is required, limestone is used as the sorbent and forms a portion of the bed. There are two main types of fluidized bed combustion systems. They are referred to as bubbling fluid bed (BFB) types and circulating fluid bed (CFB) types. In the former air in excess of that required to fluidize the bed passes through the bed in the form of bubbles. The bubbling fluid bed is further characterized by modest bed solids mixing rate and relatively low solids entrainment in the flue gas. The circulating fluid bed (CFB) type is characterized by higher velocities and finer particle sizes. In" such systems the fluid bed surface becomes diffuse as solids entrainment increases, such that there is no longer a defined bed surface. Circulating fluid bed systems have a high rate of material circulating from the combustor to the particle recycle system and back to the combustor. The present invention has particular application to circulating fluid bed boilers although those skilled in the art may recognize other applications. Characteristics of apparatus of this general type are further described in the publication Combustion Fossil Power, edited by Joseph G. Singer, P. E. and published by Combustion Engineering, Inc.; a subsidiary of Asea Brown Boveri, 1000 Prospect Hill Road, Windsor, Conn. 06095, 1991.

In a conventional circulating fluidized-bed steam generator crushed fuel and sorbent are fed mechanically or pneumatically to the lower portion of a combustor. Primary air is supplied to the bottom of the combustor through an air distributor, with secondary air fed through air ports at one or more elevations in the lower part of the combustor. Combustion takes place throughout the combustor, which is filled with bed material. Flue gases and entertained solids leave the combustor and enter one or more cyclones where the solids are separated and fall to a seal pot. From the seal pot, the solids are recycled to the combustor. Optionally, some solids may be diverted through a plug valve to an external fluidized-bed heat exchanger (FBHE) and back to the combustor. In the FBHE, tube bundles absorb heat from the fluidized solids.

The air distribution within the fluidized bed is achieved with in the prior art apparatus by a plurality of mutually parallel stainless steel pipes that extend vertically from a base plate for the fluidized-bed. The upper end of each of these pipes is capped. Each pipe has a plurality of radially extending holes to direct air throughout the bed to achieve the fluidization. Each of the holes in these pipes are typically between 0.070 to 0.090 inches in diameter. Such pipes are usually cast and then the holes are drilled in the walls thereof. Because of the stainless steel material attempts to cast the pipes with removable pins to form the polls have been unsuccessful. Thus, the expense of manufacture of such pipes is substantial.

These prior art constructions are also vulnerable to plugging of the holes due to contaminants in the air being supplied to the fluidized-bed. This requires maintenance to clean out the holes. In some cases this may result in down time for the steam generation apparatus. Even if the steam generating apparatus is down for other maintenance there is always competition to perform various maintenance procedures within the furnace and it is therefore highly desirable to minimize the requirement for cleaning of the air distribution system and the fluidized-bed apparatus.

It is an object of the present invention to insure thorough mixing and intimate contact of the reactants in a fluidized bed apparatus.

It is an object of the invention to provide air distribution apparatus in a fluidized bed assembly that will require less maintenance.

Another object of the invention is to provide apparatus which may be manufactured more easily and at less cost than the known apparatus.

Still another object of the invention is provided apparatus which will more effectively distribute the air in the fluidized-bed apparatus and thus will not require as many individual structures in the prior art apparatus.

SUMMARY OF THE INVENTION

It has now been found that these and other objects of the invention may be attained in a fluidized bed system which includes a housing, a floor comprising a plurality of generally parallel tubes joined by fins intermediate adjacent tubes. A plurality of nozzle assemblies extend generally vertically in mutually parallel relationship from the floor, each of the nozzle assemblies including a generally cylindrical body having a centerline disposed in generally perpendicular relationship to the floor, each of the bodies including a plurality of heads extending generally radially therefrom at an axial extremity thereof remote from the floor.

In some embodiments of the invention each of the heads are uniformly spaced around the circumferential extent of each of the bodies and each of the heads is generally cylindrical and has a centerline. Each of the centerlines of the heads may be disposed at an angle with respect to a horizontal plane and the angle may be approximately twenty degrees.

In some forms of the invention some of the nozzle assemblies each have four heads and some of the nozzle assemblies have two heads. In other embodiments all of the nozzle assemblies have two heads. In other embodiments all of the nozzle assemblies have four heads.

BRIEF DESCRIPTION OF THE DRAWINGS

The invention will be better understood by reference to the accompanying drawing in which.

DESCRIPTION OF THE PREFERRED EMBODIMENTS

Figure 1:
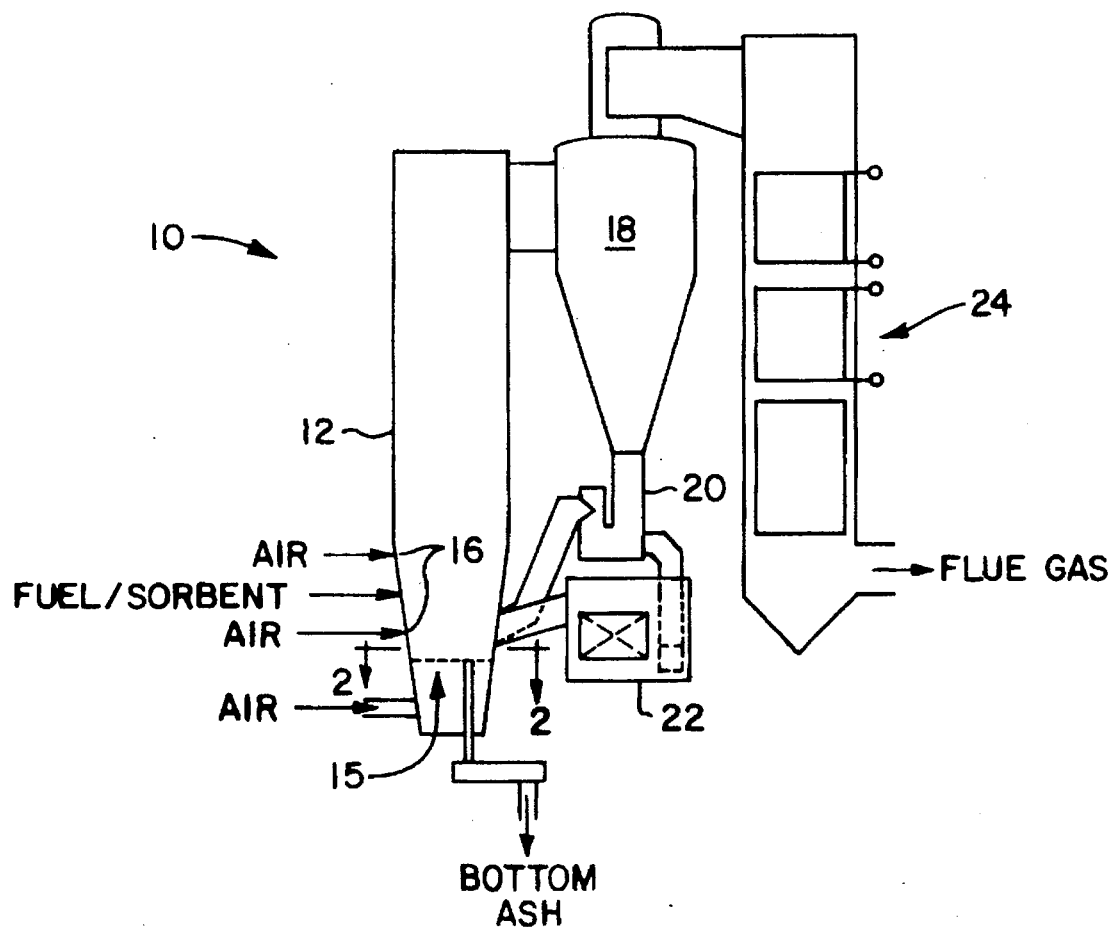
FIG. 1 is a partially schematic, elevational view of a typical circulating fluidized-bed steam generator in which the present invention may be utilized.

Referring now to FIG. 1, there is shown a conventional circulating fluidized-bed steam generator 10. Crushed fuel and sorbent are fed mechanically or pneumatically to the lower portion of a combustor 12. Primary air is supplied to the bottom of the combustor 12 through an air distributor 14, with secondary air fed through air pods 16 at one or more elevations in the lower pad of the combustor. Combustion takes place throughout the combustor 12, which is filled with bed material. Flue gases and entertained solids leave the combustor and enter one or more cyclones 18 where the solids are separated and fall to a seal pot 20. From the seal pot 20, the solids are recycled to the combustor 12. Optionally, some solids may be diverted through a plug valve (not shown) to an external fluidized-bed heat exchanger (FBHE) 22 and back to the combustor 12. In the FBHE 22, tube bundles absorb heat from the fluidized solids. Flue gas is directed from the cyclones to a convection pass 24.

Figure 2:
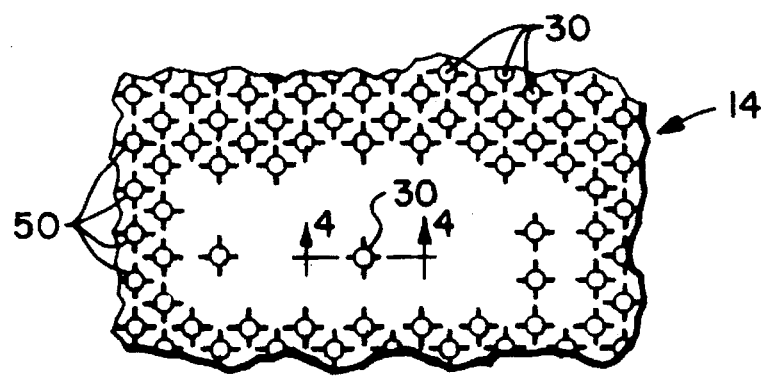
FIG. 2 is a plan view taken along the line 2—2 of FIG. 1 illustrating a fragment of the plate that supports the fluidized-bed.
Figure 3:
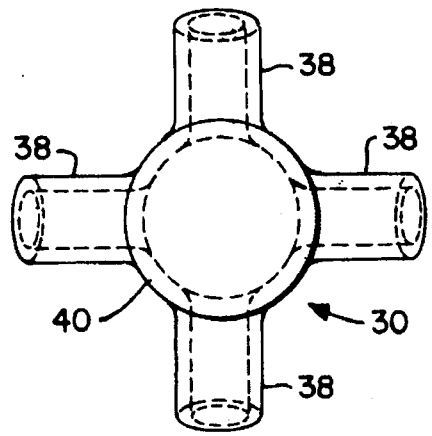
FIG. 3 is a plan view of one embodiment of the fluidized-bed nozzle in accordance with the present invention.
Figure 4:
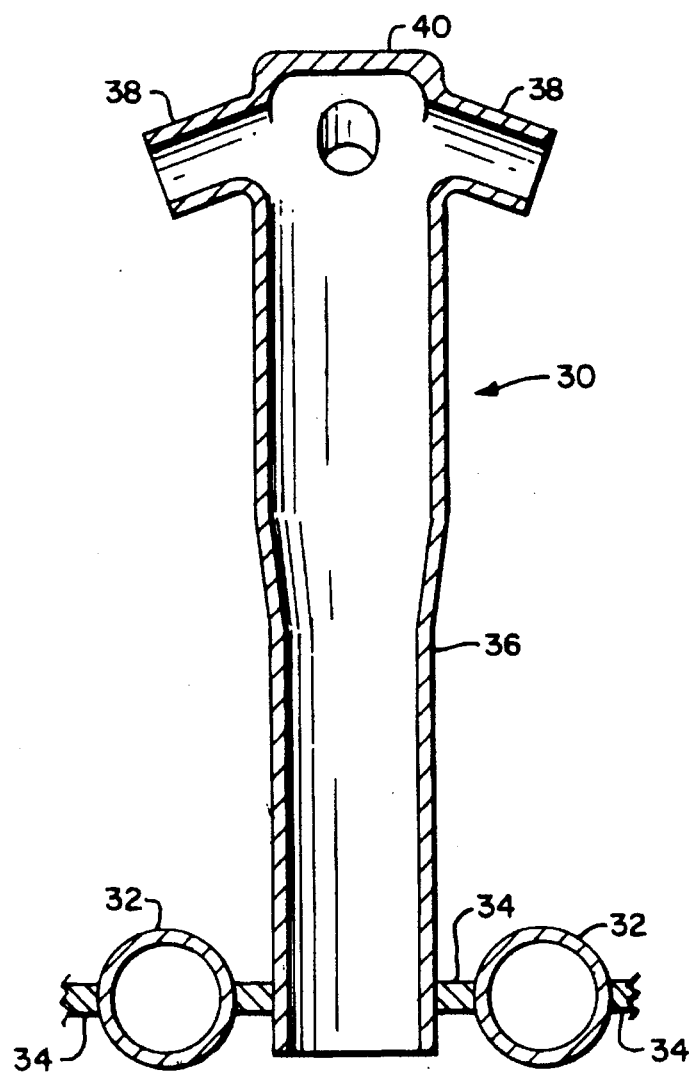
FIG. 4 is a cross section of the nozzle shown in FIG. 3 taken along a vertical plane as indicated by the line 4—4 of FIG. 2.

Referring now to FIGS. 2, 3 and 4, there is shown a first embodiment of a nozzle 30 in accordance with a preferred form of the invention. It will be understood that the support 14 for the fluidized-bed comprises a plurality of tubes 32 that are joined by respective fins 34. The tubes 32, 32 carry the water that is being heated in the steam generation apparatus illustrated in FIG. 1. As will be seen from FIG. 2 a large number of the nozzles 30 extend vertically from the floor or support 14 for the fluidized-bed.

Each nozzle 30 includes an elongated generally cylindrical body 36 that necks to a slightly larger diameter at essentially the middle of the axial extent thereof. The necked portion thereof is desirable primarily because of the limited space available intermediate adjacent tubes 32. Thus, the spacing of the tubes 32, 32 limits the maximum diameter of the body 36 at the lower extremity thereof. A slightly larger diameter is preferable at the upper extent of the body 36 to provide better flow to the four heads 38, 38, 38, 38. The four heads 38 are each generally cylindrical and the respective centerlines of two of the heads 38 are, in this preferred embodiment, disposed in first plane and the two other heads are disposed in a second plane. The first and second planes that are mutually perpendicular. In a preferred form of the invention the individual heads have an inside diameter of approximately 1.1 inches. The body 36 has an inside diameter at the lower portion thereof of 2.5 inches and an inside diameter at the upper axle extent thereof of 3.0 inches.

Preferably, the centerlines of the heads 38 are each inclined at an included angle of 20 degrees with respect to a horizontal plane. In a typical installation the nozzle 30 has an overall height of 18 inches and the spacing between centerlines of the tubes 32, 32 is seven inches. Those skilled in the art will recognize that substantially different dimensions will be utilized in other specific fluidized bed constructions for other specific applications. The nozzle 30 has been designed in a manner that permits casting of the entire nozzle 30 in a single sand casting process. The sand casting process will simultaneously form the body 36, the four heads 38 and the dome 40.

Advantageously, the nozzle 36 is not as vulnerable to being plugged by the air being directed to the fluidized-bed because the openings in the respective heads 38 are much larger than the holes in the prior art constructions. In addition, there are many less nozzle assemblies 30 required than pipes of the prior art design. This requirement for less nozzle assemblies 30 than the prior art pipes follows because of (a) the size of the openings in the heads 38 and (b) the angular orientation of the heads 38.

Because the nozzle assemblies 30 may be fabricated by a simple casting operation the cost of one nozzle 30 is approximately 50 percent of the cost of the pipes used previously. A further saving is possible because of the larger flow capacity of each nozzle 30 as compared to one prior art pipe. More specifically, with the new design in accordance with the present invention there are 50 percent less nozzle assemblies 30 than pipes were required in the prior art assemblies. The combined effect results in approximately a 75 percent cost reduction when compared to the prior art systems.

Figure 5:
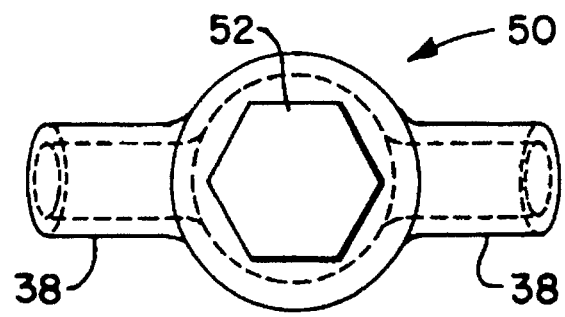
FIG. 5 is a view similar to FIG. 3 of another embodiment of the apparatus in accordance with the invention.
Figure 6:
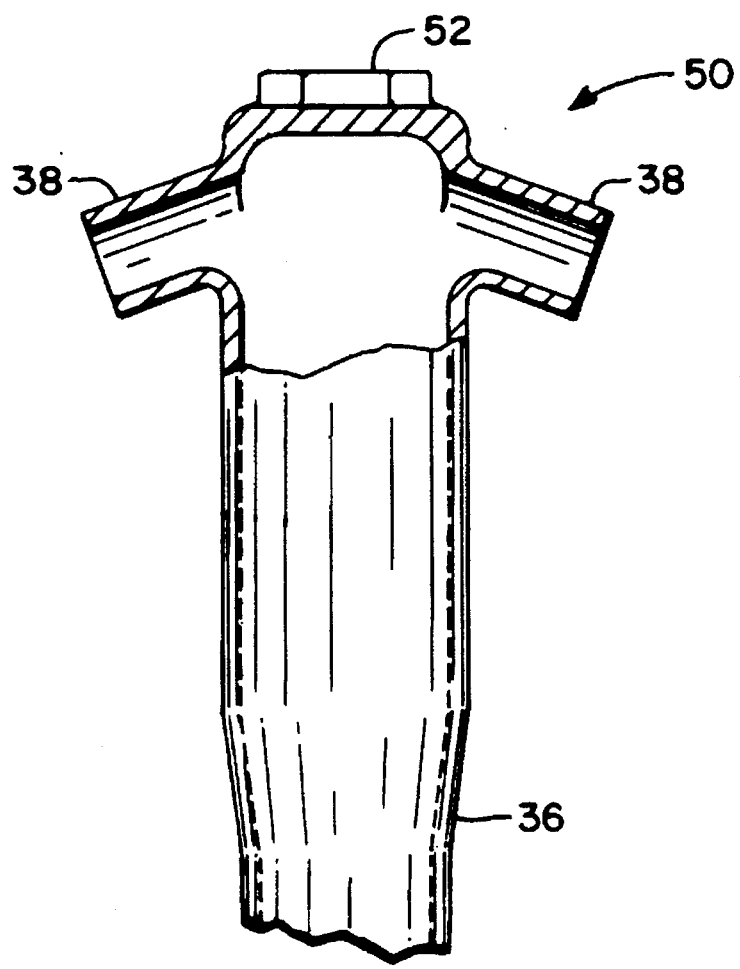
FIG. 6 is a fragmentary view of the apparatus of FIG. 5 and generally similar to the view of FIG. 4 except that the lower portion has been eliminated for simplicity.

Referring now to FIGS. 5 and 6, there is shown another embodiment of the nozzle assembly in accordance with the present invention. The nozzle assembly 50 is similar to the nozzle assembly 30 except that it has only two heads 38. The heads 38 are each generally cylindrical and each inclined with respect to a horizontal plane as in the nozzle assembly 30. Also as in the nozzle assembly 30 the centerlines of the heads 38 are disposed in a common plane. The body 36 of the nozzle assembly 50 is substantially identical to the body 36 of the nozzle 30. The dome 52 may differ somewhat in shape from the dome 40 of the nozzle 30 but the differences are not material.

The nozzle assembly 50 has primary application for use adjacent to the walls of the combustor 12. The nozzle assembly 50 also has application for some retrofit applications although it will be understood that the nozzle also 30 also has application for many retrofit applications. In those applications where it is desirable to use the nozzle assembly 50 there will need to be more nozzle assemblies than would be required if the nozzle assembly 30 was being incorporated in the system. However there will still be less nozzle assemblies 30 than if the prior art pipes were as part of the system.

The invention has been described with reference to its illustrated preferred embodiment. Persons skilled in the art of such devices many, upon exposure to the teachings herein, conceive other variations. For example, the invention has been described in terms of both a four head and a two head embodiment, those skilled in the art will recognize that other variations such as a three head embodiment are within the scope of the invention. Such variations are deemed to be encompassed by the disclosure, the invention being delimited only by the following claims.

Having thus described are invention, we claim:

1. A fluidized-bed system which comprises:

a housing;

a floor comprising a plurality of generally parallel tubes joined by fins intermediate adjacent tubes; and a plurality of nozzle assemblies extending generally vertically in mutually parallel relationship, each of said nozzle assemblies including a generally cylindrical body having a centerline disposed in generally perpendicular relationship to said floor, each of said bodies including a plurality of heads extending generally radially therefrom at an axial extremity thereof remote from said floor, each of said nozzle assemblies being mounted in a manner that prevents rotation thereof about a geometric axis extending the length of said body, each of said heads being uniformly spaced around the circumferential extent of each of said bodies, each of said heads being generally cylindrical and has a centerline, each of said centerlines of said heads being disposed at an oblique angle with respect to a horizontal plane.

2. The apparatus as described in claim 1 wherein:

the angle with respect to which said centerline of each of said heads is disposed with respect to a horizontal plane is approximately twenty degrees.

3. The apparatus as described in claim 2 wherein:

said nozzle assemblies each have four heads.

4. The apparatus as described in claim 3 wherein:

said nozzle assemblies each have at least two heads.

5. The apparatus as described in claim 4 wherein:

some of said nozzle assemblies have at least one more head.

6. The apparatus as described in claim 4 wherein:

some of said nozzle assemblies have at least two more heads.

7. The apparatus as described in claim 4 wherein:

wherein some of said nozzle assemblies have four heads.

\* \* \* \* \*